(12) United States Patent
Tang et al.

(10) Patent No.: US 6,759,502 B1
(45) Date of Patent: Jul. 6, 2004

(54) SYNTHESIS OF HYPERBRANCHED ORGANOMETALLIC POLYMERS AND THEIR USE AS PRECURSORS TO ADVANCED CERAMIC MATERIALS

(75) Inventors: Ben Zhong Tang, Kowloon (CN); Kaitian Xu, Kowloon (CN); Han Peng, Kowloon (CN); Jingdong Luo, Kowloon (CN); Xixiang Zhang, Kowloon (CN); Qunhui Sun, Highett (AU); Wing Yip Lam, Kowloon (CN); John A. K. Cha, Yuen Long (CN)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 10/106,752

(22) Filed: Mar. 26, 2002

Related U.S. Application Data

(60) Provisional application No. 60/278,722, filed on Mar. 26, 2001.

(51) Int. Cl.[7] ............................................. C08G 77/60
(52) U.S. Cl. .............................. 528/9; 556/11; 501/154
(58) Field of Search ............................... 528/9; 556/11; 501/154

(56) References Cited

PUBLICATIONS

Sun et al., Polymer Preprints, 40(2), 657, 1999.*
Sun et al. "Optically Active Hyperbranched Poly(n–Alkyl-triferrocenylsilanes): 1. Synthesis and Structural Characterization" *Polym. Mater. Sci. Eng., 82*, 105–106 (2000).
Sun et al. "Preparation of Magnetic Fe/Si/C Polymorphs from Hyperbranched Poly(1,1'–ferrocenylenemethylsilyne) Presursors" *Polym. Mater. Sci. Eng., 82*, 107–108 (2000).
Sun et al. "XPS Analysis of Fe/Si/C Polymorphs Prepared From Poly(1,1'–ferrocenylenemethylsilyne)" *Polym. Mater. Sci. Eng. 82*, 109–110 (2000).
Sun et al. "Nanocluster–Containing Mesoporous Magnetoceramics from Hyperbranched Organometallic Polymer Precursors" *Chem. Mater. 12*, 2617–2624 (2000).

* cited by examiner

*Primary Examiner*—Margaret G. Moore
(74) *Attorney, Agent, or Firm*—Heslin Rothenberg Farley & Mesiti, P.C.

(57) ABSTRACT

Hyperbranched organometallic polymers, including poly [1,1'-ferrocenylenesilynes], poly [1,1'-ferrocenylene-(alkyl)silynes], poly [1,1'-ferrocenylene(alkenyl)silynes] and poly [1,1'-ferrocenylene(aromatic)silynes], are useful as precursors to certain ceramic materials. Processes for the preparation of such polymers and the preparation of ceramic materials from such polymers are described, as are the resulting ceramic materials and their use as ferromagnetic materials and electrically conductive materials.

23 Claims, 4 Drawing Sheets

Figure 1: SEM photographs of ceramics 129 (upper) prepared by pyrolysis of 117 at 1200°C under argon and ceramics 133 (lower) prepared from 122 at 1000°C under argon.

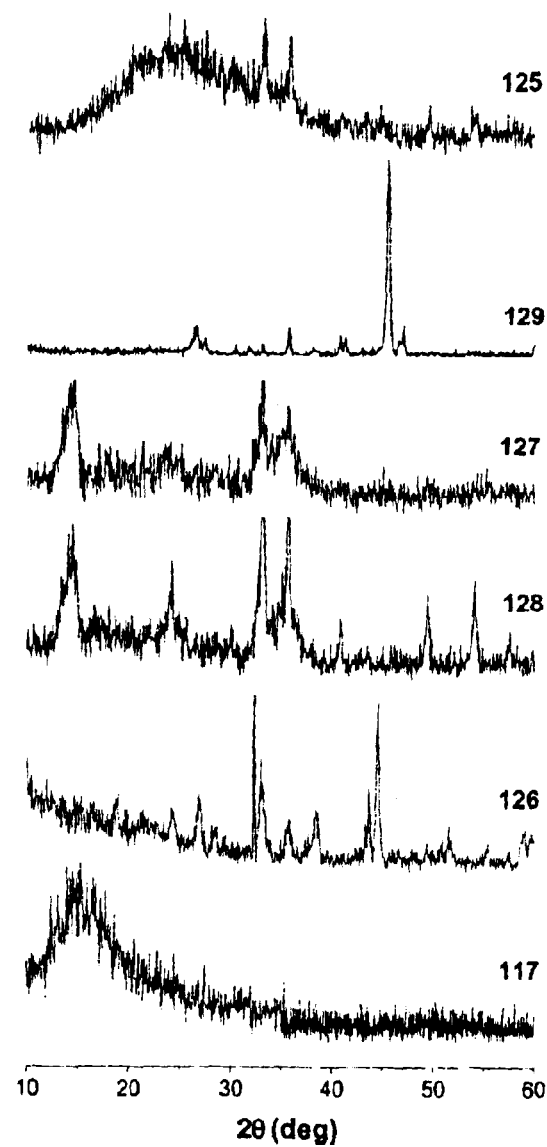
Figure 2. XRD patterns of poly[1,1'-ferrocenylene(methyl)silyne] (117) and its ceramic products 125-129

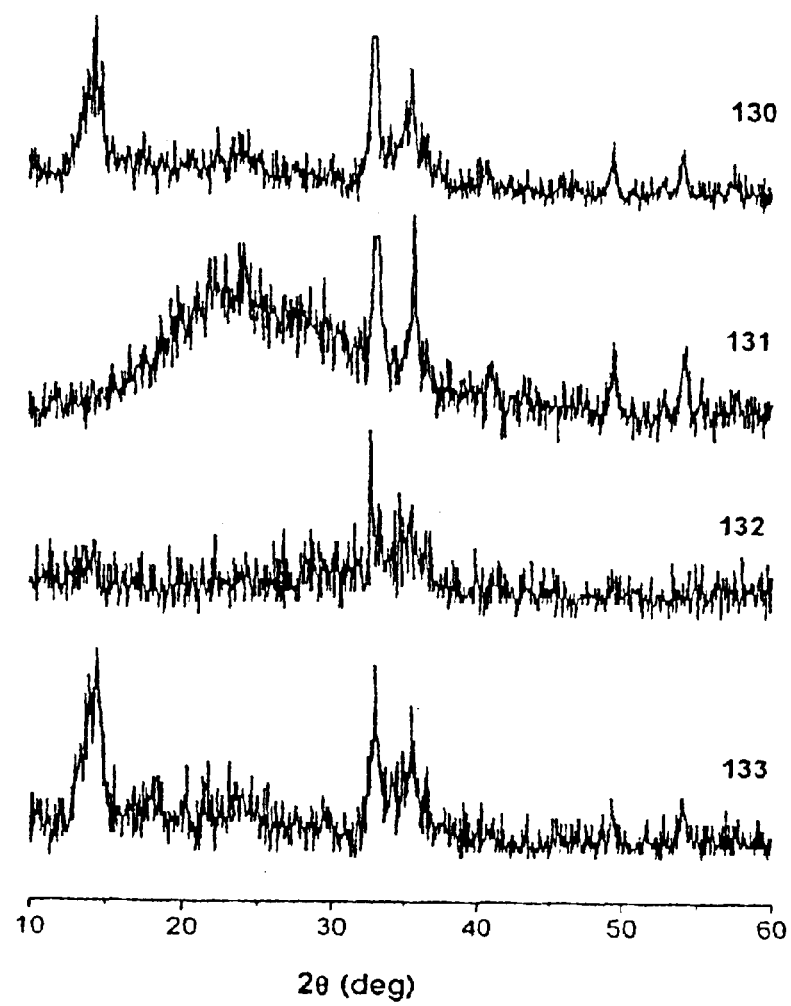
Figure 3. XRD patterns of ceramic products 130-133 prepared from poly[1,1'-ferrocenylene(vinyl)silyne] (122).

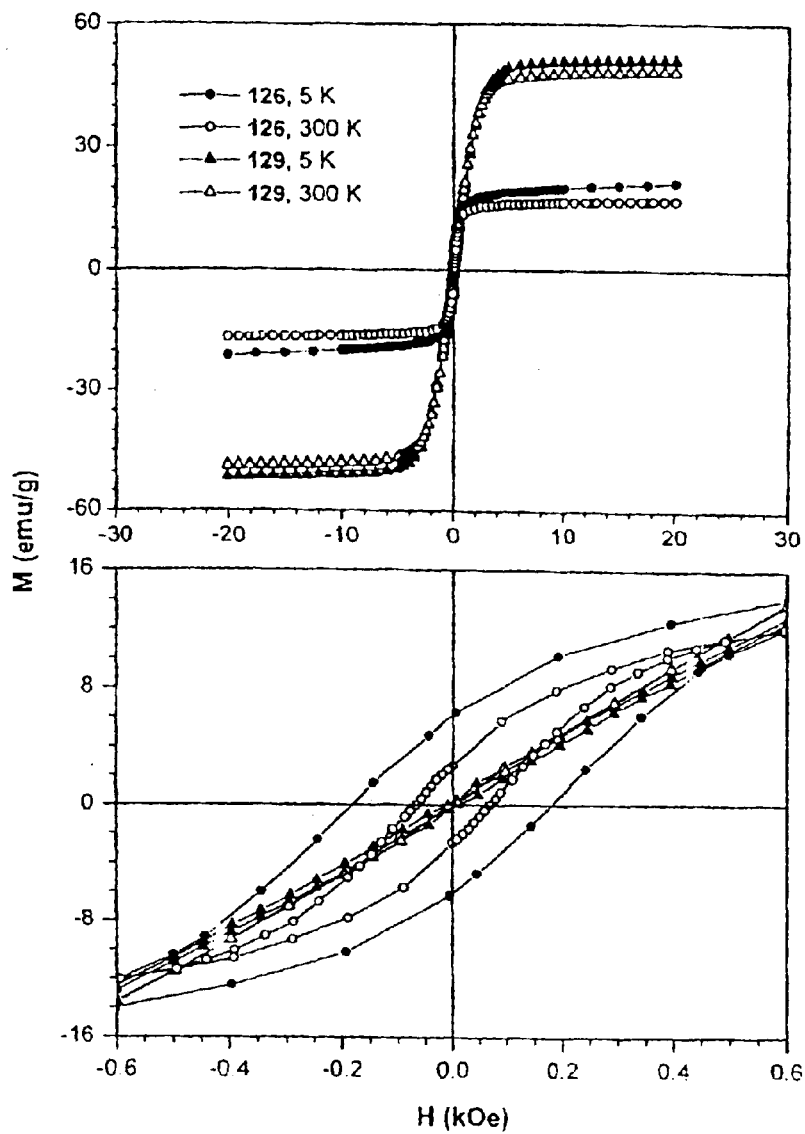
Figure 4. Plots of magnetization (M) versus applied magnetic field (H) at 5 and 300 K for ceramics 126 and 129, the lower panel being the enlarged part of the magnetization curves in the low magnetic field region.

SYNTHESIS OF HYPERBRANCHED ORGANOMETALLIC POLYMERS AND THEIR USE AS PRECURSORS TO ADVANCED CERAMIC MATERIALS

CROSS REFERENCE TO RELATED APPLICATIONS

This application claims the priority of U.S. provisional application No. 60/278,722, filed Mar. 26, 2001, the disclosure of which is incorporated herein by reference.

FIELD OF THE INVENTION

This invention relates to certain hyperbranched organometallic polymers which are useful as precursors to certain ceramic materials, processes for the preparation of such polymers and the preparation of ceramic materials from such polymers, ceramic materials and their use as ferromagnetic materials and electrically conductive materials.

SUMMARY OF THE INVENTION

According to a first aspect of the present invention there is provided a process for the preparation of a hyperbranched organometallic polymer which comprises reacting dilithioferrocene or a complex thereof with a compound of the general formula $RSiX_3$ in which R represents a hydrogen atom or an optionally substituted alkyl, alkenyl or aromatic group and each X independently represents a halogen atom, optionally in the presence of an anionic initiator.

Preferably, the compound of general formula $RSiX_3$ is added as a solution in an ether solvent such as tetrahydrofuran. The reaction is conveniently carried out at a temperature from −80° C. to room temperature (20 to 30° C.).

In this specification, any alkyl group, unless otherwise specified, may be linear or branched and may contain up to 24, preferably up to 20, and especially up to 18, carbon atoms. Preferred alkyl groups are n-alkyl groups, that is, linear alkyl groups, with methyl, octyl, dodecyl, hexadecyl and ociadecyl groups being especially preferred.

Any alkenyl group, unless otherwise specified, may be linear or branched and may contain up to 12, preferably up to 6, and especially up to 4, carbon atoms. Linear alkenyl groups are preferred and ethenyl (vinyl), propenyl and butenyl groups are especially preferred. Ethenyl groups are particularly preferred.

An aromatic group may be any aryl or heteroaryl group, with aryl groups being particularly preferred. An aryl group may be any monocyclic or polycyclic aromatic hydrocarbon group and may contain from 6 to 14, especially 6 to 10, carbon atoms. Preferred aryl groups include phenyl, naphthyl, anthryl and phenanthryl groups, especially a phenyl or naphthyl, and particularly a phenyl, group. A heteroaryl group may be any aromatic monocyclic or polycyclic ring system which contains at least one heteroatom. Preferably, a heteroaryl group is a 5- to 14-membered, and especially a 5- to 10-membered, aromatic ring system containing at least one heteroatom selected from oxygen, sulphur and nitrogen atoms. Preferred heteroaryl groups include pyridyl, pyrrolyl, furyl, thienyl, indolinyl, imidazolyl, pyrimidinyl, pyrazinyl, oxazolyl, thiazolyl, purinyl, quinolinyl, quinoxalinyl, pyridazinyl, benzofuranyl, benzoxazolyl and acridinyl groups.

A halogen atom may be a fluorine, chlorine, bromine or iodine atom. Chlorine atoms are particularly preferred.

When any of the foregoing substituents are designated as being optionally substituted, the substituent groups which are optionally present may be any one or more of those customarily employed in the development of polymers and ceramic materials and/or the modification of such compounds to influence their structure/activity, stability or other property. Specific examples of such substituents include, for example, halogen atoms, nitro, cyano, hydroxyl, alkyl, haloalkyl, alkoxy, haloalkoxy, amino, alkylamino, dialkylamino, formyl, alkoxycarbonyl, carboxyl, alkanoyl, alkylthio, alkylsulphinyl, alkylsulphonyl, carbamoyl and alkylamido groups. When any of the foregoing substituents represents or contains an alkyl substituent group, this may be linear or branched and may contain up to 12, preferably up to 6, and especially up to 4, carbon atoms. A halogen atom may be a fluorine, chlorine, bromine or iodine atom and any group which contains a halo moiety, such as a haloalkyl group, may thus contain any one or more of these halogen atoms.

It is preferred that a complex of dilithioferrocene with tetramethylethylene diamine (TMEDA) is used. This complex of dilithioferrocene with TMEDA, that is, dilithioferrocene. TMEDA, may be prepared by reacting ferrocene with TMEDA in the presence of a solvent and a lithiating agent. Preferably, the solvent is a hydrocarbon solvent, such as anhydrous hexane. It is also preferred that the lithiating agent is n-butyl lithium. This reaction may be conveniently carried out at a temperature from −8° C. to room temperature (20 to 30° C.).

The process steps described above may also be carried out in a one-pot reaction. According to a second aspect of the invention there is therefore provided a one-pot process for the preparation of a hyperbranched organometallic polymer which comprises reacting ferrocene with TMEDA in the presence of a solvent and a lithiating agent, optionally adding an anionic initiator, and reacting the resultant mixture with a compound of the general formula $RSiX_3$ in which R represents a hydrogen atom or an optionally substituted alkyl, alkenyl or aromatic group and each X independently represents a halogen atom.

The lithiating agent in the above processes may be any compound which is capable of attaching lithium atoms to the ferrocene. One such lithiating agent is n-butyl lithium.

In some instances, it may be necessary or desirable to add an agent to facilitate the reaction between the dilithioferrocene or complex thereof and the compound of general formula $RSiX_3$. For instance, it may be preferable to add an anionic initiator to get the ring moieties possibly existing in the system open. N-Butyl lithium may act as an anionic initiator in this respect. Preferably, this is added to the reaction mixture under an inert atmosphere, such as nitrogen.

As n-butyl lithium can function both as a lithiating agent and an anionic initiator, it is particularly advantageous to use this compound in the processes of the present invention.

In both processes, it is preferred that R represents an optionally substituted $C_{1-24}$ alkyl or $C_{2-12}$ alkenyl group. Preferably, R represents an optionally substituted $C_{1-20}$, especially $C_{1-18}$, alkyl group or an optionally substituted $C_{2-6}$, especially $C_{2-4}$, alkenyl group. Preferably, such alkyl and alkenyl groups arc linear. It is especially preferred that R represents an n-alkyl or linear alkenyl group, with methyl, n-octyl, n-dodecyl, n-hexadecyl, n-octadecyl and ethenyl (vinyl) groups being especially preferred. The optional substituents may be any of those listed previously with halogen atoms being particularly preferred.

Although each X may represent a different halogen atom, it is preferred that all three X atoms represent the same halogen atom. Preferably, each X represents a chlorine atom.

In a third aspect, the invention provides a hyperbranched organometallic polymer produced by any of the processes described above.

Such hyperbranched organometallic polymers are believed to be novel compounds. According to a fourth aspect of the invention there is therefore provided a hyperbranched organometallic polymer selected from the group consisting of poly [1,1'-ferrocenylenesilynes], poly [1.1'-ferrocenylene-(alkyl)silynes], poly [1.1'-ferrocenylene (alkenyl)silynes] and poly [1,1'-ferrocenylene(aromatic) silynes]. In these polymers, every silicon atom is surrounded on average by 3/2 (1.5) ferrocenylene moieties and one R moiety.

Preferably, the hyperbranched organometallic polymer has a general formula

(I)

in which Fc represents a 1,1'-ferrocenylene group, R represents a hydrogen atom or an optionally substituted alkyl, alkenyl or aromatic group and n represents an integer greater than 1.

It is preferred that the polymer described above contains at least one moiety of the general formula

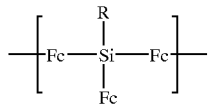

in which Fc and R are as defined above.

The polymer may have a structure of the general formula:

(A)

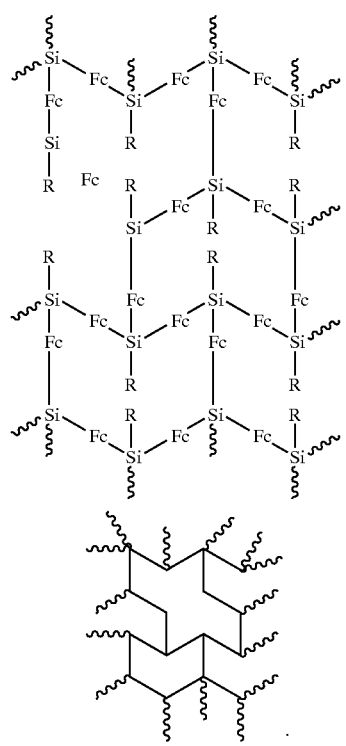

in which Fc and R are as defined above.

It is believed that such structures form when the silicon atom is in a sterically accessible environment thereby promoting a three-directional propagating reaction. This situation tends to arise when R is relatively small. Thus, polymers of the invention in which R represents a methyl or ethenyl (vinyl) group have the above structure of formula (A).

The polymer may also have a structure of the general formula:

(B)

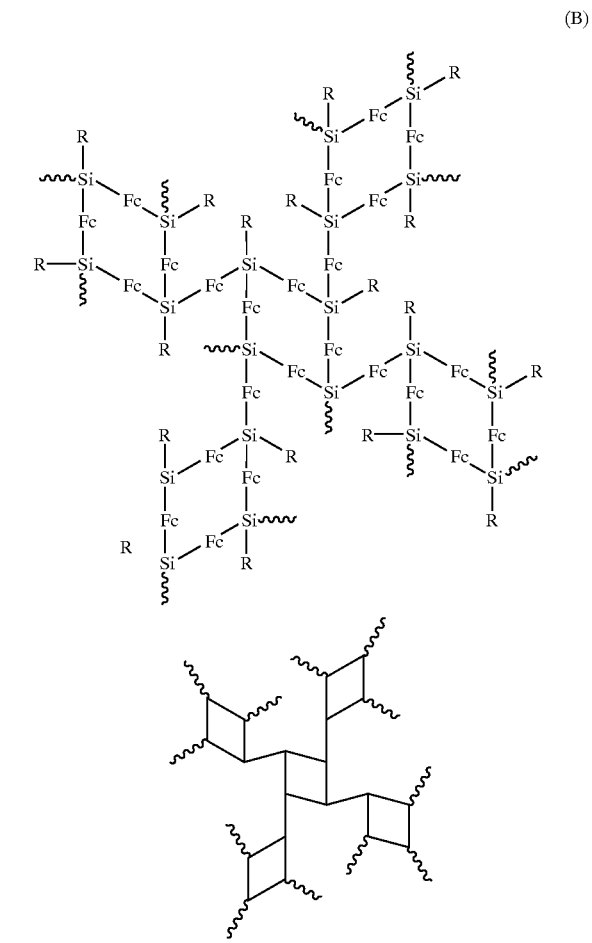

in which Fc and R are as defined above.

When R is a lengthy or bulky group, it is thought that such groups may encumber the silicon atom from nucleophilic attack. Also, the steric hindrance of such groups may hinder the formation of a cross-linking network. Thus, polymers of the above structure tend to form when R is a lengthy or bulky group. Polymers of the invention in which R represents a $C_{8-24}$ alkyl particularly an n-$C_{8-24}$ alkyl, group have the above structure of formula (B), especially polymers in which R represents an n-octyl, n-dodecyl, n-hexadecyl or n-octadecyl group.

It has also been found that the hyperbranched organometallic polymers of the invention, which tend to be three-dimensional spheres, can be pyrolysed to form ceramic materials with advantageous properties. According to a further aspect of the invention there is therefore provided a process for the preparation of a ceramic material which comprises pyrolysing a hyperbranched oragnometallic polymer as defined above under an inert gas atmosphere.

Preferably, the inert gas is nitrogen or argon. It is also preferred that the process is carried out at a high temperature, temperatures in the range from about 700° C. to about 1200° C. being particularly preferred.

Sintering at high temperatures under nitrogen and argon converts the polymers to ceramic materials in yields of about 48–62%. These yields are much higher than those obtained using linear counterpart polymers, as described in the prior art. The hyperbranched polymers of the invention are thus superior to the corresponding linear polymers as ceramic precursor polymers. It is thought that the three-dimensional spheres of the hyperbranched polymers serve as shielding nets to keep the atoms inside thereby enabling the high-yield production of the ceramic materials. Most of the hyperbranched polymer precursors of the invention are soluble in common solvents, melt at relatively low temperatures and can be processed into robust engineering forms such as thin films. This excellent processability is therefore a further advantage.

The process conditions affect the structure of the ceramic material end product. For instance, in general, the nanocrystals in ceramic materials prepared by pyrolysis under nitrogen are mainly $\alpha$-$Fe_2O_3$ whereas those in ceramics prepared under argon are mainly $Fe_3Si$.

In a further aspect, the invention provides a ceramic material produced by a process as described above.

The invention still further provides a ceramic material containing iron, silicon and carbon which comprises a three-dimensional mesoporous network of nanoclusters.

Analysis has shoved that the ceramic materials produced by the process described above tend to have four elements on the ceramic surface, namely, iron, silicon, carbon and oxygen. The first three of these elements come from the polymer precursor. However, it is thought that the oxygen may be introduced by the moisture absorbed by the polymer samples prior to pyrolysis and/or by the post-oxidation of the mesoporous ceramics during the handling and storage processes. Ceramic materials of the invention therefore may also contain oxygen.

As mentioned above, the precise structure of such ceramic materials can be altered by varying the process conditions under which they are formed.

The iron content of ceramic materials of the invention is about 4 times higher (about 40%) than that of ceramic materials prepared from the corresponding linear precursors. Normally, ceramics prepared from polymer precursors are used as structural materials (eg. silicon carbide, silicon nitride, etc.). However, the high iron content and the nanodimensions of the iron clusters endow the ceramic materials of the invention with high electrical conductivity and supermagnetic susceptibility. The saturation magnetisability of the ceramic materials of the invention at room temperature is about 50 emu/g, which is much higher than that from the corresponding linear polymers (up to about 3 emu/g). Moreover, the hysteresis loss of the magnetic ceramics of the invention is virtually zero. Also, these materials show near-zero remanence and coercivity. Thus, the ceramics of the invention are excellent soft ferromagnetic materials.

In further aspects, the invention therefore provides the use of a ceramic material as defined above as a ferromagnetic material and the use of a ceramic material as defined above as an electrically conductive material.

These properties make the ceramic materials of the invention particularly useful for the manufacture of smart magnetic cards, magnetic thin coatings, information recording and storage media, magnetic refrigeration, color imaging, ferrofluids, cell sorting, medical diagnosis, control site- and target-specific drug delivery, nanodimensional motors and switches, reusable supported catalysts and mesoporous filters.

Other features and advantages of the various aspects of the present invention will be apparent from the disclosures of Sun and Tang, *Poly. Mater. Sci. Eng.* 82, 105–106 (2000); Sun et al *Poly. Mater. Sci. Eng.* 82, 107–108 (2000): Sun, Wong and Tang, *Poly. Mater. Sci. Eng.* 82, 109–110 (2000); and Sun et al., *Chem. Mater.* 12, 2617–2624 (2000), which are incorporated herein by reference.

BRIEF DESCRIPTION OF THE DRAWINGS

FIG. 2 depicts XRD patterns of poly[1,1'-ferrocenylene (methyl)silyne] (117) and its ceramic product 125–129.

FIG. 3 depicts XRD patters of ceramic products 130–133 prepared form poly[1,1'-ferrocenylene(vinyl)silyne (122).

FIG. 4 shows plots of magnetization (M) versus applied magnetic field (H) at 5 and 300 k for ceramics 136 and 129, the lower panel being the enlarged part of the magnetization curves in the low magnetic field region.

EXAMPLES

Materials

Figure 1:
FIG. 1 contains SEM photographs of ceramics 129 (upper) prepared by pyrolysis of 117 at 1200° C. under argon; and ceramics 133 (lower) prepared from 122 at 1000° C. under argon.

The materials used in the following Examples were as follows: Ferrocene (98%) was purchased from Aldrich and recrystallized with ethanol before use. Dilithioferrocene TMEDA was synthesized as described in literature (for example, see D. Foucher et al, *Macromolecules*, 1994, 27, 3992). Methyltrichlorosilane (111; Aldrich), n-octyltrichlorosilane (112; Lancaster), n-dodecyltrichlorosilane (113; UCT), n-hexadecyltrichlorosilane (114; UCT), n-octyidecyltrichlorosilane (115) and vinyltrichlorosilane (116) (both Lancaster) were all distilled via calcium hydride before use. Tetramethylethylene diamine (TMEDA, Acros), diethyl ether, n-hexane, and THF (all from Lab-Scan) were all distilled over sodium or calcium hydride before use, n-Butyllithium (1.7 M in heptane, Aldrich) and other solvents were used as received.

Instrumentation $^1H$ and $^{13}C$ NMR analysis were performed on a Bruker ARX 300 NMR spectrometer using chloroform-d as solvent and TMS (0.03% v/v) as internal standard. Infrared spectra were measured on a Perkin Elmer 16 PC FT-IR spectrophotometer. UV spectra were recorded on a Milton Roy Spectronic 300 Array spectrophotometer, the molar absorptivity ($\epsilon_{max}$) of the polymer were calculated on the basis of their repeat units. Molecular weight estimates were made by a gel permeation chromatography (GPC) using a Waters Associates liquid chromatograph with a Waters 510 HPLC pump, Rheodyne 77251 injector with a stand kit, ultrastyragel columns (HT3, HT4, and HT6; molecular weight range $10^2$–$10^7$), a column temperature controller, A Waters 486 wavelength-tunable UV-vis detector, a Waters 410 differential refractometer, and a system DMM/scanner with an 8-channel scanner option. DSC analysis was performed on a SETARAM DSC 92 instrument at a heating range of 10° C./nin under $N_2$ atmosphere. Thermogravimetric analysis (TGA) was performed at a heating rate of 20° C./min under purified $N_2$ using a Perkin-Elmer TGA 7 thermogravimetric analyzer.

Examples 1 to 9

Preparation and Characterization of Hyperbranched Polymers

A one-pot synthetic methodology was used to prepare a number of organometallic poly[1,1'-ferrocenylene(alkyl)

silynes] having a hyperbranched structure according to the general scheme shown below in Scheme 1:

n-hexadecyltrichlorosilane (114) in 50 mL THF was added. The temperature was raised from −78° C. to room tempera-

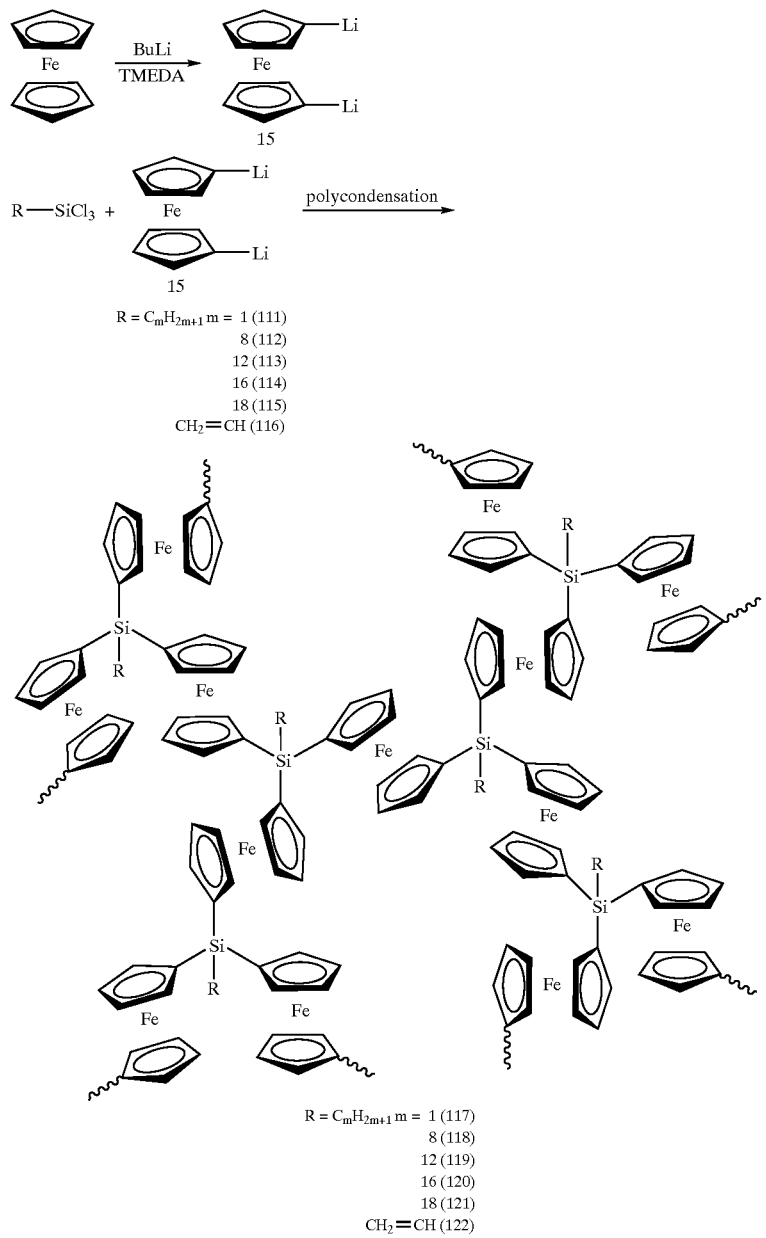

Example 1

Preparation of Poly [1,1′-ferrocenylene(hexadecyl)silyne] (120): Synthesis of 120 is given here as an example of how the other hyperbranched polymers were obtained. 0.622 g (3.35 mmol) of ferrocene, 0.6 mL of TMEDA and 15 mL anhydrous hexane were added into an dried 100 mL two-necked round bottom flask at room temperature. Then, 2.7 mL (6.8 mmol) n-BuLi (2.5 M in hexane) was carefully injected through a syringe under $N_2$ atmosphere with magnetic stirring. An orange slurry solution was obtained gradually. The solution was stirred for 8 h at room temperature (ca. 22° C.) and then cooled to below −78° C. by a dry ice/acetone bath. Following, 0.8 mL (0.806 g, 2,24 mmol) of ture in 4 h and the mixture was stirred for another 20 h. After that, the mixture was terminated by adding 0.2 mL methanol and passed through a Pyrex filter to get rid of the fine white particles of LiCl. The filtrant was slightly concentrated and then passed through a cotton-filter into a large volume of MeOH (ca. 800 mL) with vigorous stirring. A brown thin film at the bottom of glass beaker was obtained. After stripping off the solvent, the film became transparent and brown, adhering on the glass surface as a thin film. Poly[1, 1′-ferrocenylene(hexadecyl)silynes] (120) in brown clastomer was obtained in 52% yield (0.6102 g). It is soluble in common organic solvent such as dichloromethane, chloroform, THF, toluene. IR: $\upsilon(cm^{-1})$ 3090, 2922, 2852, 2112, 1696, 1629, 1466, 1379, 1165, 1036, 807, 722, 688. $^1$H NMR (CDCl$_3$): δ (ppm) 4.39 (Cp). 1.29 (strong, alkyl).

Example 2

Preparation of Poly[1,1'-ferrocenylene(methyl)silyne] (117): Yield 29%. Golden yellow powdery solid which is dried in vacuo at 20° C. and partially soluble in general organic solvents such as CHCl$_3$, THF, etc. IR; υ(cm$^{-1}$) 3088, 2958, 2930, 2115 1690, 1570, 1421, 1252, 1166, 1036, 776 732. $^1$H NMR(CDCl$_3$) (soluble part): δ (ppm) 4.1–4.5 (d.strong and broad, Cp), 0.73 (t, Ct$_3$).

Example 3

Preparation of Poly[1,1'-ferrocenylene(octyl)silyne] (118): Yield: 31%. Soluble amber powdery solid dried in vacuo at 40° C. IR: υ(cm$^{-1}$) 3090, 2955, 2924, 2854, 1693, 1466, 1164, 1108, 1036, 830, 724, 684. $^1$H NMR (CDCl$_3$): δ (ppm) 4.0–4.5 (d,Cp), 1.33, 0.91 (d, strong and broad, alkyl). $^{13}$C NMR (CDCl$_3$): δ (ppm) 73.15, 70.93 (carbons on Cp connected to Si), 67.73 (d. strong and broad, other carbons on Cp), 34.88, 31.53 29.31, 25.32, 26.90, 22.80, 11.51, 12.30, 26.90, 14.22 (alkyl).

Example 4

Preparation of Poly[]1,1'-ferrocenylene(dodecyl))silyne] (119): Yield: 54%. Soluble brown elastomer with a lustrous profile after broken (dried in vacuo at 40° C.). IR: υ(cm$^{-1}$) 3088, 2954, 2922, 2855, 1694, 1466, 1360, 1164, 1037, 1024, 829, 688. $^1$H NMR (CDCl$_3$): δ (ppm) 4.52, 4.21 (d,Cp), 1.30, 0.90 (d, strong and broad, alkyl). $^{13}$C NMR (CDCl$_3$): δ (ppm) 73.10, 70.81 (carbons on Cp connected to Si), 67.91 (other carbons on Cp), 2.34, 31.93, 22.68, 13.38, 14.09 (alkyl).

Example 5

Preparation oh Poly[1,1'-ferrocenylene(dodecyl)silyne] (121): Yield: 72%. Soluble golden yellow powdery solid (dried in vacuo at 20° C.). IR: υ(cm$^{-1}$) 3019, 2923, 2853, 1692, 1672, 1467, 1379, 1165, 1037, 830, 817, 721, 688. $^1$H NMR (CDCl$_3$): δ (ppm) 4.52, 4.22 (d,Cp), 1.28 ,0.89 (d.strong, alkyl). $^{13}$C NMR (CDCl$_3$): δ (ppm) 73.30, 71.60 (carbons on Cp connected to Si). 68.40 (other carbons on Cp). 33.81, 31.88, 30.43, 30.07, 20.74, 22.63, 14.82, 13.44

Example 6

Preparation of Poly[1,1'-ferrocenylene(vinyl)silyne] (122): Yield: 32%. Partially soluble golden yellow powdery solid (dried in vacuo at 20° C.). IR: υ(cm$^{-1}$) 3090, 2943, 1694, 1592, 1420, 1404, 1164, 1105, 1036, 830, 819, 732, 693. Soluble part was used for NMR determinations. $^1$H NMR (CDCl$_3$): δ (ppm) 5.5–6.2 (broad, Cp), 4.19 (broad and strong, vinyl). $^{13}$C NMR (CDCl$_3$): δ (ppm) 74.76, 72.82 (carbons on Cp connected to Si), 69.18 (other carbons on Cp), 134 (broad, vinyl).

Example 7

To ascertain whether if there is a silicon-bridged, strained ring structure existing in the final products after the polymerization aiming at getting polymers with higher $M_w$, a post cure treatment was carried out for all of the purified polymers. 120 is used here as a specific example. To a Pyrex vacuum tube, ~150 mg of 120 was added, and the tube was sealed under ultrahigh vacuum, then the tube was heated to 150° C. and kept at this temperature for 2 h. The obtained darkened brown sample was insoluble in THF at first, but became completely dissolved after ultrasonic shaking for 60 min. This exemplified that there was no such strained ring residues left in the products after polymerization. To testify this quantitatively, DSC apparatus was used to detect the heat flow in situ at 150° C. isothermally. Nothing was recorded but a horizontal smooth straight line, indicating clearly that the samples did not undertake any chemical reactions during the post-cure process. Thus, it appears that the one-pot condensation polymerization takes place exactly in line with route proposed earlier, forming the hyperbranched polymers without other side-reactions.

Example 8

The hyperbranched structures of the polymers synthesised in Examples 1 to 6 were also confirmed by determination of intrinsic viscosity and absolute molecular weight. As an example, polymer 121 was studied by light scattering. had a $M_w$ ~2000 from GPC, however, it exhibited a very low intrinsic viscosity at 0.02 dL/g and an absolute molecular weight as high as $5 \times 10^5$. The unusual low intrinsic viscosity and much larger value of absolute molecular weight revealed the hyperbranched structures of the polymers.

Example 9

The effect of changing the length of the alkyl group at silicon was investigated, and the results are summarised in Table 1. As can be seen, the alkyl groups at silicon play an important role in determining the average $M_w$ of the products. With the increase of alkyl groups length, the $M_w$ and the number average polymerization degree $P_n$ of the samples increased. In fact, the $M_w$ of 120 reached 2300. It is postulated that a wealth of polymers with even higher $M_w$ than those already obtained could be produced if the alkyl group is even longer. The group at silicon also accounts for enhancing the solubility, for example, 118–121 became completely soluble in general organic solvents in comparison with 117 and 122. This is very important for such polymers in light of feasibility in applications and theoretical analysis.

TABLE 1

Synthesis and Properties of Poly[1,1'-ferrocenylene(alkyl)silynes] {—[Fc$_{3/2}$(R)Si]$_n$—}$^a$

| No. | —[Fc$_{3/2}$(R)Si]$_p$— | Yield (%) | Solubility$^b$ | $M_w$$^c$ | $M_w/M_n$$^c$ |
|---|---|---|---|---|---|
| 1 | CH$_3$(117) | 29 | Δ | 1200 | 1.4 |
| 2 | C$_8$H$_{17}$(118) | 31 | O | 1200 | 1.4 |
| 3 | C$_{12}$H$_{25}$(119) | 54 | O | 1700 | 1.5 |
| 4 | C$_{16}$H$_{33}$(120) | 52 | O | 2300 | 1.6 |
| 5 | C$_{18}$H$_{37}$(121) | 72 | O | 1800 | 1.8 |
| 6 | CH$_2$=CH(122) | 32 | Δ | 1300 | 1.6 |

$^a$ polymerization reactions of 1,1'-dilithioferrocene (FcLi$_2$) (15) and alkyltrichlorosilanes (C$_m$H$_{2m+1}$SiCl$_3$) were carried out under an atmosphere of dry nitrogen in THF at −78° C. for 24 h with a [FcLi$_2$]/[C$_m$H$_{2m+1}$SiCl$_3$] ratio of 3/2. $^b$ Tested in common organic solvents including THF, chloroform, dichloromethane, and toluene; symbol: O=completely soluble, Δ=partially soluble. $^c$ Estimated by GPC in THF on the basis of a polystyrene calibration.

Examples 10 to 23

Preparation and Characterization of Ceramics from Hyperbranched Polymers

The pyrolysis of linear polysilaferrocenophanes is already known. (for example Scheme 2 shows the controlled pyrolysis of poly[1] silaferrocenophane).

Scheme 2

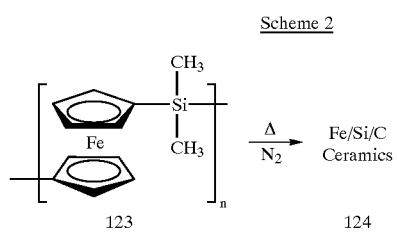

Hyperbranched polymers are different from linear ones in terms of the dimensionality of molecular architecture, the former being three-dimensional spheres while the latter are one-dimensional chains. Compared to the open chains, the closed spheres should in principle better retain the constituent elements during the pyrolysis process, thus giving higher ceramic yields. Hyperbranched polymers are also different from crosslinked networks, the former being often soluble whereas the latter being inherently insoluble, processability is one of the important advantages of the preceramic polymer processes and the possibility of using hyperbranched polymers as precursors for the preparation of advanced ceramic materials was therefore explored.

Examples 1 to 9 relate to the synthesis and characterization of such hyperbranched iron- and silicon-containing organometallic polymers, poly[1.1'ferrocenylene(n-alkyl) silynes] by the polymerization of 1.1'-dilithioferrocene with n-alkyltrichlorosilanes. The following examples relate to the use of these organometallic polymers in the manufacture of ceramic materials.

Scheme 3 demonstrates the synthesis of such hyperbranched polymers, and their pyrolysis to form ceramic structures 125 to 133.

Scheme 3

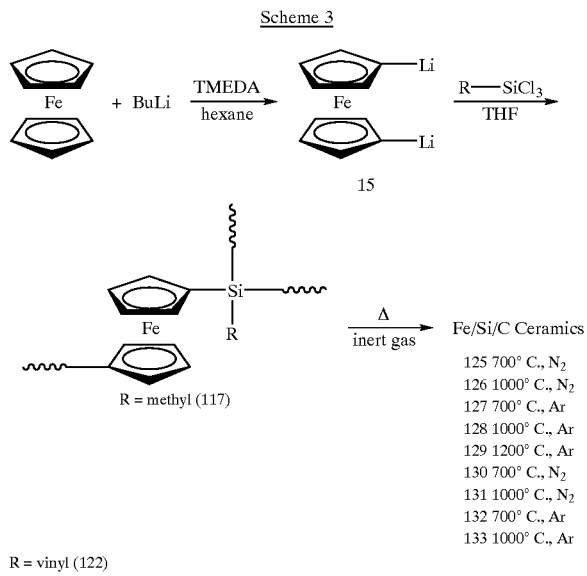

In the hyperbranched polymers (e.g. 117), every one of the silicon atoms is surrounded on the average by 3/2 (or 1.5) ferrocenylene moieties, and its theoretical iron content is thus higher than that of its linear counterpart (e.g. 123), in whose monomer (repeat) unit, one silicon is linked with only one ferrocenylene group. The pyrolysis of 123 gave volatile fragmentation by-products such as cyclic silaferrocenophanes, which sublimed out from the sintering system, contributing to the low iron content of 124. The three-dimensional molecular structure of hyperbranched polymers may suppress the iron loss caused by the volatilization, enhance the chances for the iron atoms to participate in the network formation, and hence increase the iron content of the ceramic end products.

With these considerations in mind, in this chapter, the ceramization of the hyperbranched polysilynes 117 and 122 was investigated. The pyrolysis of 117 and 122 produces ceramics 125–133 (Scheme 3), which possess mesoporous morphologies, contain large amounts of iron nanoclusters, and exhibit soft ferromagnetism with negligibly small hysteresis loss.

Instrumentation

IR and $^1$H and $^{13}$C NMR spectra were recorded, and DSC and TGA analyses were carried out as before (see Examples 1 to 9). Morphologies of the ceramic products were investigated on a JEOL 6300 scanning electron microscope (SEM) operating at an accelerating voltage of 5 kV, and the as-prepared ceramics were directly used in the SEM analysis without coating with gold metal. Energy-dispersion X-ray (EDX) analyses were performed on a Philips XL30 SEM system with quantitative elemental mapping and line scan capacities operating at an accelerating voltage of 15 kV. X-ray photoelectron spectroscopy (XPS) measurements were conducted on a PHI 5600 spectrometer (Physical Electronics) and the core level spectra were measured using a monochromatic Al Kα X-ray source (hυ=1486.6 eV). The analyzer was operated at 23.5 eV pass energy and the analysed area was 800 μm in diameter. Binding energies were referenced to the adventitious hydrocarbon C 1s line at 285.0 eV and curve fitting of the XPS spectra was performed using the least square method. X-ray diffraction (XRD) diagrams were recorded on a Philips PW 1830 powder diffractometer using monochromatized X-ray beam from a nickel-filtered Cu Kα radiation (λ=1.5406 Å). Magnetization measurements were carried out using a superconducting quantum interference device (SQUID) magnetometer (Quantum Design MPMS-5S) at fields ranging from 0 to 20 kOe and at temperatures of 5 and 300 K.

Example 10

Ceramic 126: In one typical pyrolysis experiment conducted under nitrogen. 28 mg of poly[1.1'-ferrocenyl (methyl)silyne] (117) was placed in a sample cell of Perkin-Elmer TGA 7 analyzer. The sample was heated to 1000° C. at a heating rate of 10° C./min and calcinated at the highest temperature for 1 h. A ball-shaped ceramic product 126 was obtained in ~50% yield. EDX, atomic composition (%): Fe 36.0, Si 24.4, C 30.2, ( ) 9.4. XPS, atomic composition (%): Fe 6.1, Si 0.7, C 78.0, O 15.2; binding energy (eV): Fe $2p_{3/2}$: 707.4, 712.3; Fe $2p_{1/2}$: 720.2, 725.8; Si 2p: 104.0. (For assignments of the species with the core-level binding energies, see Tables 3 and 4) XRD, 2θ (degree)/d spacing (Å): 19.00/4.67(9), 26.90/3.31(3), 28.45/3.13(4), 32.35/2.76 (5), 33.00/2.71(2), 35.65/2.51(8), 38.45/2.34(0), 43.65/2.07 (2), 44.55/2.03(3), 49.50/1.83(6), 51.00/1.79(2), 51.60/1.77 (0), 54.75/1.67(6), 57.50/1.60(0), 59.85/1.54(2), 66.30/1.41 (2'), 67.4011.38(7). (For assignments of the peaks associated with Bragg reflections of the nanocrystals $Fe_3Si$, $Fe_3O_4$, α-$Fe_2O_3$, $SiO_2$, SiC, and C, see Table 5). SQUID, $M_s$ (emu/g); 21.3 (at 5 K), 15.9 (at 300 K): remanence ($M_r$; emu/g): 6.4 (5 K), 2.6 (300 K); coercivity ($H_c$; Oe): 180 (5 K), 65 (300 K).

Example 11

Ceramics 125: Prepared from 117 through the same procedures as above at 700° C. under $N_2$ atmosphere. Yield:

~50%. EDX, atomic composition (%): Fe 24.0, Si 19.8, C 7.4, O 48.9; XPS, atomic composition (%): Fe 10.3, Si 21.7, C 6.4, O 61.6; binding energy (eV): Fe $2p_{3/2}$: 711.7; Fe $2p_{1/2}$: 720.0, 725.1; Si 2p: 104.1. (For assignments of the species with the core-level binding energies, see Tables 3 and 4) XRD, 2θ (degree)/d spacing (Å): 25.25/3.52, 33.2/2.70, 35.7/2.51, 40.9/2.21, 49.5/1.84, 54.25/1.69, 62.6/1.48, 64.0511.45, 72.05/1.31, 75.5/1.26 (For assignments of the peaks associated with Bragg reflections of the nanocrystals α-$Fe_2O_3$, $SiO_2$, see Table 5)

Example 12

Ceramic 127: Prepared from 117 through the same procedures as above at 700° C. under Ar atmosphere. Yield: ~50%. EDX, atomic composition (%): Fe 15.5. Si 20.3, C 6.6, O 57.8. XPS atomic composition (%): Fe 12.9, Si 19.7, C 6.7, O 60.7, binding energy (eV): Fe $2p_{1/2}$: 711.2, Fe $2p_{1/2}$: 719.4, 724.9; Si 2p: 103.2. (For assignments of the species with the core-level binding energies, see Tables 3 and 4) XRD, 2θ (degree)/d spacing (Å): 14.55/6.08, 35.6/2.52 (For assignments of the peaks associated with Bragg reflections of the nanocrystals α-$Fe_2O_3$, see Table 5) SQUID, $M_s$, (emu/g): 7.3 (at 5K), 5.0 (at 300 K); remanence ($M_r$; emu/g): 1.6 (5K) 0.29 (300K;); coercivity ($H_c$; Oe): 427 (5K), 50 (300K).

Example 13

Ceramic 128: Prepared from 117 through the same procedures as above at 1000° C. under Ar atmosphere. Yield: ~50%. EDX, atomic composition (%): Fe 27.4, Si 14.7, Al 3.1, C 4.4, O 50.3 (Al is impurity contaminated from sample cell). XPS, atomic composition (%): Fe 11.8, Si 18.0, C 12.0, O 58.2; binding energy (eV): Fe $2p_{3/2}$: 711.6; Fe $2p_{1/2}$: 719.7, 725.0; Si 2p: 103.6. (For assignments of the species with the core-level binding energies, see Tables 3 and 4) XRD, 2θ (degree)/d spacing (Å): 13.25/6.68, 14.05/6.30, 14.45/6.13, 24.15/3.68, 35.65/2.52, 40.85/2.21, 49.4/1.84, 54.1/1.69 57.6/1.60, 62.4/1.50, 64.0/1.45 (For assignments of the peaks associated with Bragg reflections of the nanocrystals α-$Fe_2O_3$, γ-$Fe_2O_3$, see Table 5) SQUID, $M_s$ (emu/g): 7.0 (at 5K), 5.1 (at 300K); remanence ($M_s$; emu/g): 2.1 (5K), 0.4 (300K); coercivity ($H_c$; Oe): 563 (5K), 124 (300K).

Example 14

Ceramic 130: Prepared from 122 through the same procedures as above at 700° C. under $N_2$ atmosphere. Yield: ~50%. EDX, atomic composition (%): Fe 29.1, Si 15.8, C 5.2, O 50.0. XPS, atomic composition (%): Fe 14.9, Si 15.7, C 14.3, O 55.2; binding energy (eV): Fe $2p_{3/2}$: 711.4; Fe $2p_{1/2}$: 719.3, 725.1; Si 2p: 103.1. (For assignments of the species with the core-level binding energies, see Tables 3 and 4) XRD, 2θ (degree)/d spacing (Å): 14.5/6.10, 35.55/2.52, 40.65/2.22, 49.5/1.84, 54.1/1.69, 57.5/1.60 (For assignments of the peaks associated with Bragg reflections of the nanocrystals α-$Fe_2O_3$, γ-$Fe_2O_3$ see Table 5) SQUID, $M_s$ (emu/g): 13.0 (at 5K). 9.6 (at 300K); remanence ($M_r$; emu/g): 3.1 (5K). ~0 (300K): coercivity ($H_c$; Oe): 536 (5K). ~O (300K).

Example 15

Ceramic 131: Prepared from 122 through the same procedures as above at 1000° C. under $N_2$ atmosphere. Yield: ~50%. EDX, atomic composition (%): Fe 27.7, Si 18.1, C 3.1, O 51.2. XPS, atomic composition (%): Fe 9.1, Si 21.0, C 14.9, O 55.0; binding energy (eV): Fe $2p_{3/2}$: 711.1; Fe $2p_{1/2}$: 719.4, 724.8; Si 2p: 103.3. (For assignments of the species with the core-level binding energies, see Tables 3 and 4) XRD, 2θ (degree)/d spacing (Å): 24.15/3.68, 33.2/2.70, 35.7/2.51, 40.9/2.21, 49.5/1.84, 54.25/1.69, 62.6/1.48, 64.05/1.45, 72.05/1.31, 75.5/1.26 (For assignments of the peaks associated with Bragg reflections of the nanocrystals α-$Fe_2O_3$, γ-$Fe_2O_3$, see Table 7.4.) SQUID, $M_s$ (emu/G): 14.8 (at 5K), 12.1 (at 300K): remanence ($M_r$; emu/g): 5.1 (5K), 1.3 (300K); coercivity ($H_c$; Oe): 595 (5K). 112 (300K).

Example 16

Ceramic 132: Prepared from 122 through the same procedures as above at 700° C. under Ar atmosphere. Yield ~50%. EDX, atomic composition (%): Fe 28.1, Si 13.0, C 3.6, O 55.3. XPS, atomic composition (%): Fe 17.1, Si 16.7, C 8.0, O 57.8; binding energy (eV): Fe $2p_{3/2}$: 711.4; Fe $2p_{1/2}$: 720.0, 725.0; Si 2p: 103.0.) (For assignments of the species with the core-level binding energies, see Tables 3 and 4) XRD, 2θ (degree)/d spacing (Å): 34.95/2.57 (For assignments of the peaks associated with Bragg reflections of the nanocrystals α-$Fe_2O_3$, see Table 5) SQUID, $M_s$ (emu/g): 13.1 (at 5K), 9.7 (at 300K); remanence ($M_r$; emu/g): 2.6 (5K). ~0 (300K); coercivity ($H_c$; Oe): 596 (5K). ~0 (300K).

Example 17

Ceramic 133: Prepared from 122 through the same procedures as above at 1000° C. under Ar atmosphere. Yield: ~50%. EDX, atomic composition (%): Fe 30.9, Si 16.7, C 5.6, O 46.9. XPS, atomic composition (%): Fe 14.7, Si 18.4, C 8.7, O 58.2; binding energy (eV): Fe $2p_{3/2}$: 711.2; Fe $2p_{1/2}$: 719.6, 724.8: Si 2p: 103.2. (For assignments of the species with the core-level binding energies, see Tables 3 and 4) XRD, 2θ (degree)/d spacing (Å): 34.95/2.57 (For assignments of the peaks associated with Bragg reflections of the nanocrystals α-$Fe_2O_3$, see Table 5). SQUID, $M_s$ (emu/g): 13.2 (at 5K), 10.8 (at 300K); remanence ($M_r$: emu/g): 4.6 (5K), 2.0 (300K); coercivity ($H_c$; Oe): 672 (5K), 268 (300K).

Example 18

Ceramic 129: In another typical pyrolysis experiment carried out under argon, ~40 mg of 117 was placed in a quartz tube in a Winston-Salem Thermcraft furnace which was heated to 1200° C. at a heating rate of 10° C./min in a stream of argon (flow rate: ~200 $cm^3$/min). The sample was sintered at the temperature for 1 h, which gave a ceramic product 129 in ~50% yield. EDX, atomic composition (%) Fe 43.2, Si 29.1, C 22.4, O 5.3. XPS, atomic composition (%): Fe 3.8, Si 0.6, C 86.7, O 8.9; binding energy (eV): Fe $2p_{3/2}$: 707.4, 710.8; Fe $2p_{1/2}$; 720.2, 724.8; Si 2p: 99.9, 101.5, 104.0. (For assignments of the species with the core-level binding energies, see Tables 3 and 4) XRD, 2θ (degree)/d spacing (Å): 26.50/3.36(4), 27.40/3.23(6) 30.40/2.93(7), 33.00/2.70(6), 35.48/2.52(8), 38.05/2.35(7), 40.75/2.21(1), 41.20/2.18(8), 45.40/1.99(6), 46.50/1.95(2), 59.95/1.54(2), 66.35/1.40(8), 69.00/1.36(0), 84.15/1.14(9). (For assignments of the peaks associated with Bragg reflections of the nanocrystals Fe, $Fe_3Si$, α-$Fe_2O_3$, γ-$Fe_2O_3$, $SiO_2$, SiC, and C, see Table 5). SQUID, $M_s$ (emu/g): 51.3 (at 5K), 49.6 (at 300K); the $M_r$ and $H_c$ values at 5 and 300 K being all virtually nil (~0).

Example 19

The samples of the polysilynes 117 and 122 used in Examples 10 to 17 were prepared according to the polymerization reaction shown in Scheme 3. For comparison, a linear polysilylene of similar structure 123 was prepared according to published procedures (for example, see Foucher et al. *J. Am. Chem. Soc.*. 1992. 114, 6246: Finckh et al. *Organometallics* 1993, 12, 823: Foucher et al. *Angew. Chem. Int. Ed. Engl.* 1993, 32, 1709; Foucher et al. *Macromolecules* 1993, 26. 2878). TGA was used to investigate the pyrolysis of the hyperbranched polysilynes under nitrogen. For both polymers 117 and 122, the pyrolysis gives a golden-coloured ball-shaped ceramic product in the TGA cell in ~50% yield. The ceramic yields vary in the range of ~48–62% from batch to batch but are all higher than that (~36%) of its linear counterpart 123. The pyrolysis yield monotonically decreases with an increase in the length of the alkyl chain. When alkyl is increased to $C_{12}$-$H_{25}$, the ceramic yields decrease to ~30%, which are, however, still ~2 times higher than that (~17%) of its linear cousin with a similar number of carbon atoms, e.g. poly[1,1'-ferrocenylene (diphenyl)silylene]. Clearly, the hyperbranched polymers are superior to the linear ones in terms of thermolytic conversion to ceramic products. Cutting the backbone of a linear polymer a few times will quickly decrease its molecular weight, and volatilisation of the low molecular weight fragments leads to a low ceramic yield. On the other hand, breaking a few bonds of a hyperbranched polymer may not easily change its polymeric nature because of its three-dimensional molecular architecture. The hyperbranched structure may even be viewed as a partial network, which should facilitate the crosslinking-induced ceramization, leading to an effective retention of the chain elements in the ceramic products. When a polymer possesses a complete network structure, it should give ceramic products in even higher yields. Crosslinked network polymers are, however, completely insoluble; as ceramic precursors, they suffer from the disadvantage of poor processability.

Example 20

The SEM measurements of the ceramic products can be carried out without coating with gold metal. The clear images of the SEM photomicrographs indicate that the ceramics are electrically highly conductive, suggesting the existence of conductive graphite carbon and metallic iron species in the ceramic products. As can be seen from FIG. 1, the ceramics 129 from 117 look like a coral reef, in which the continuous skeletons are running through a mass of "islands" or clusters. many of which have sizes of a few hundred nanometers. On the two-dimensional imaging plane, the nanoclusters are separated by mesoscopic pores, but three-dimensionally they are all tortuously interconnected, with the continuous skeletons providing the architectural support. Without wishing to be bound by theory, it is postulated that the coral reef-like mesoporous structure is generated by the fast simultaneous evaporation of volatile organics and agglomeration of the inorganic elements in the pyrolysis process.

Example 21

XPS spectroscopy was used to estimate the surface composition of the ceramic products. The XPS analysis shows that four elements are present on the ceramic surface, namely, iron, silicon, carbon and oxygen (Table 2). Oxygen has often been found in the ceramic products prepared by the polymer precursor routes. About 19% oxygen, for example, was detected in 124 by XPS, although the pyrolysis of 123 was conducted in a sealed quartz tube under nitrogen (cf. Scheme 2). The iron nanoparticles of the ceramics generated inside the periodic mesoporous silica were also covered by oxide layers. The oxygenic species may be introduced by the moisture absorbed by the polymer samples prior to pyrolysis and/or by the post-oxidation of the mesoporous ceramics during the handling and storage processes.

TABLE 2

Atomic Composition of Ceramics 125–133 Estimated by XPS and EDX Analyses

| no. | ceramics | | Fe | Si | C | O |
|---|---|---|---|---|---|---|
| | | | atomic composition (%) | | | |
| 1 | 125 | (XPS) | 10.3 | 21.7 | 6.4 | 61.6 |
| 2 | | (EDX) | 24.0 | 19.8 | 7.4 | 48.9 |
| 3 | 126 | (XPS) | 6.1 | 0.7 | 78.0 | 15.2 |
| 4 | | (EDX) | 36.0 | 24.4 | 30.2 | 9.4 |
| 5 | 127 | (XPS) | 12.9 | 19.7 | 6.7 | 60.7 |
| 6 | | (EDX) | 15.5 | 20.3 | 6.6 | 57.6 |
| 7 | 128 | (XPS) | 11.8 | 18.0 | 12.0 | 58.2 |
| 8 | | (EDX) | 27.4 | 14.7 | 4.4 | 50.3 |
| 9 | 129 | (XPS) | 3.8 | 0.6 | 86.7 | 8.9 |
| 10 | | (EDX) | 43.2 | 29.1 | 22.4 | 5.3 |
| 11 | 130 | (XPS) | 14.9 | 15.7 | 14.3 | 55.2 |
| 12 | | (EDX) | 29.1 | 15.8 | 5.2 | 50.0 |
| 13 | 131 | (XPS) | 9.1 | 21.0 | 14.9 | 55.0 |
| 14 | | (EDX) | 27.7 | 18.1 | 3.1 | 51.2 |
| 15 | 132 | (XPS) | 17.1 | 16.7 | 8.0 | 57.8 |
| 16 | | (EDX) | 28.1 | 13.0 | 3.6 | 55.4 |
| 17 | 133 | (XPS) | 14.7 | 18.4 | 8.7 | 58.2 |
| 18 | | (EDX) | 30.9 | 16.7 | 5.6 | 46.9 |

TABLE 4

Binding Energies of Si 2p Core Levels in Ceramics 125–133 and Other Si-Containing Materials

| No. | Material | Binding Energy (eV) | | |
|---|---|---|---|---|
| 1 | 125 | 103.7 | | |
| 2 | 126 | 104.0 | | |
| 3 | 127 | 103.2 | | |
| 4 | 128 | 103.6 | | |
| 5 | 129 | 104.0 | 101.5 | 99.9 |
| 6 | 130 | 103.1 | | |
| 7 | 131 | 103.3 | | |
| 8 | 132 | 103.0 | | |
| 9 | 133 | 103.2 | | |
| 10 | $SiO_2$ | 104.2 | | |
| 11 | SiC | | 101.1 | |
| 12 | $Fe_3Si$ | | | 99.7 |

TABLE 5

Binding Energies or Fe 2p Core Levels in Ceramics 125–133 and Other Fe-Containing Materials

| No. | Material | Fe $2p_{3/2}$ | | Fe $2p_{1/2}$ | |
|---|---|---|---|---|---|
| | | Binding Energy (eV) | | | |
| 1 | 125 | | | 711.7 | 720.0 | 725.1 |
| 2 | 126 | 707.4 | | 712.3 | 720.2 | 725.8 |
| 3 | 127 | | | 711.2 | 719.4 | 724.9 |
| 4 | 128 | | | 711.6 | 719.7 | 725.0 |
| 5 | 129 | 707.4 | 710.8 | | 720.2 | 724.8 |
| 6 | 130 | | | 711.4 | 719.3 | 725.1 |
| 7 | 131 | | | 711.1 | 719.4 | 724.8 |
| 8 | 132 | | | 711.4 | 720.0 | 725.0 |
| 9 | 133 | | | 711.2 | 719.6 | 724.8 |
| 10 | Fe | 707.3 | | | 720.3 | |
| 11 | $Fe_3Si$ | 707.5 | | | | |
| 12 | $Fe_3O_4$ | | 710.8 | | | 724.7 |
| 13 | $Fe_2O_3$ | | | 711.6 | | 725.1 |

The amounts of the Fe and/or Si elements in the bulk of the ceramics detected by the EDX analysis are much higher than those on the surface. On the other hand, other hand, there are generally smaller quantities of elemental C and O in the bulk than on the surface for ceramics 125–133. This suggests that the ceramization process starts from the pyrolysis-induced formation of the inorganic metallic species. The nanoclusters shown in FIG. 1 thus may be imagined as iron-silicon inner cores coated with carbonic and oxide outer layers.

An important piece of information offered by the elemental analyses is that the ceramics 125–133 prepared under both nitrogen and argon comprise large amounts of elemental iron (3.8–14.7% by XPS and 18–43% by EDX), much higher than that (1.0% by XPS and 11% by EDX) in the ceramic 124, which was prepared by the pyrolysis of the linear polymer 123 at a similarly high temperature (1000° C.). It is postulated that the ferrocenylene moieties of 117 and 122 are confined in the roughly spherical cage of the hyperbranched polysilyne, allowing the iron species to have more time to take part in the crosslinking reaction, hence enhancing their chances to transform into non-volatile inorganic structures.

Example 22

XRD diffratometry was used to examine the bulk composition and crystal structure of the ceramic products. The precursor polymers 117 and 122 are amorphous, exhibiting no sharp reflection peaks but a diffuse halo in the 2θ angle region of ~5–30°.

Typical XRD spectra of polysilyne 117 and its ceramic products 125–129 are presented in FIG. 2. The ceramics 125–129 show diffraction patterns with numerous Bragg reflections; that is, ceramics 125–129 contain many crystalline species. Compared with the ceramics 125–129 from precursor 117, the ceramics 130–133 from precursor 122 generally exhibit less and/or broader XRD diffraction patterns (FIG. 3). This reveals that ceramics from 122 possess poorer crystallinity. The possible reason might be due to the vinyl group of 122, which would cause crosslinking reactions during pyrolysis and hence damage the regular patterns of the resultant ceramics. This crystallinity difference was also confirmed from the SEM images as discussed before. It was also noted from FIGS. 2 and 3 that ceramics baked from higher temperature (126, 128, 129, 131 and 133 prepared under 1000 or 1200° C.) possess better crystallinity than those from lower temperature (125, 127, 130 and 132 prepared under 700° C.).

The crystals in all the above ceramics i.e. 125–133 are, however, small in size, as evidenced by the line broadening of the XRD diagrams. Using the Scherrer equation (see, for example. Klug et al, *Powder X-Ray, Diffraction Techniques*; Wiley; New York, 1974), it is estimated that the sizes of the crystals are in the range of 5–117 nm. The sizes of the nanocrystals are smaller than those estimated from the SEM image, suggesting that the nanocrystals coexist with other species in the nanoclusters. In other words, the nanoclusters are not pure in composition but are mixtures of different species, in agreement with the XPS and EDX results discussed above. The nanocrystals are, however, larger than the iron nanoclusters in the ceramics prepared by other methods. One possible reason for the difference might be the higher metal content of 117 and 122, which enables the inorganic nanocrystals in 125–133 to grow bigger during the ceramization process. It is well known that large surface effect adversely contributes to the reduction in the magnetizability of small magnetic nanoclusters and it is expected that the ceramics with large magnetic nanocrystals will show high magnetizability.

The data files in the database of the Joint Committee on Powder Diffraction Standards of the International Center for Diffraction Data (JCPDS-ICDD) were used to identify the nanocrystals, and the results are summarised in Table 5. Taking ceramics 126 and 129 as the typical examples, 126 shows reflection peaks of Fe and $Fe_3Si$ crystals at 2θ=43.65° (d=2.08 Å) and 44.55° (2.03 Å), respectively. Their secondary reflections however cannot be detected, probably due to the imperfect packing structure of the nanocrystals. The diffraction diagram of 126 displays a peak of $\alpha\text{-}Fe_2O_3$ at 2Θ=33.00° (2.71 Å), whose high-order reflections are observed at 35.65° (2.52 Å), 49.50° (1.84 Å), and 54.75° (1.68 Å), implying that the $\alpha\text{-}Fe_2O_3$ nanocrystal in 126 still holds a regular packing structure (Table 5, no. 1). The reflection peaks associated with the γ form of $Fe_2O_3$ at 35.65° (2.52 Å) and 57.50° (1.60 Å) are, however, weak in intensity. Thus, while the XPS analysis provided no clear information on the crystal polymorph, the XRD analysis here reveals that the $Fe_2O_3$ nanocrystals exist mainly in the α form. The reflection peaks of $SiO_2$, SiC, and C are all weak and broad, probably because the majority of the silicon and carbon species is in the irregular amorphous state.

In the XRD diagram of 129 no peaks associated with the reflections of Fe metal were found. An intense peak of the $Fe_3Si$ nanocrystal is, however, observed at 45.40° (2.00 Å), whose higher-order reflections are clearly identifiable at 66.35° (1.41Å) and 84.15° (2.15 Å). Thus, most, if not all, of the iron species in 129 exist in the form of $Fe_3Si$. Consistent with the XPS data, 129 shows a $Fe_3O_4$ peak of moderate intensity at 35.48° (2.53 Å) but only a weak peak of $\alpha\text{-}Fe_2O_3$ at 33.00° (2.71 Å). This is in contrast to the XRD diffraction pattern of 126, in which no $Fe_3O_4$ but $\alpha\text{-}Fe_2O_3$ peaks are observed. The reflections of the $SiO_2$, SiC, and C species in 129 are again weak and broad, probably due to the same reasons as discussed above for 126.

TABLE 5

Nanocrystals in Ceramics 125–133 Identified by XRD analysis

| | | 2θ(deg)/d spacing (Å)[a] | | | | | | | | | ICDD |
|---|---|---|---|---|---|---|---|---|---|---|---|
| no. | crystal | 125[b] | 126[b] | 127[a] | 128[b] | 129[b] | 130[a] | 131[c] | 132[c] | 133[c] | file |
| 1 | $\alpha\text{-}Fe_2O_3$ | 33.15/2.70 (2.70) 35.65/2.52 (2.52) 49.50/1.84 (1.84) 54.00/1.70 (1.69) 62.50/1.49 (1.49) | 33.00/2.71 (2.70) 35.65/2.52 (2.52) 49.50/1.84 (1.84) 54.75/1.68 (1.69) | 35.60/2.52 (2.52) | 24.15/3.68 (3.68) 35.60/2.52 (2.52) 40.85/2.21 (2.21) 49.40/1.84 (1.84) 54.10/1.69 (1.69) | 33.00/2.71 (2.70) | 35.55/2.52 (2.52) 40.65/2.22 (2.21) 49.50/1.84 (1.84) 54.10/1.69 (1.69) 57.50/1.60 (1.60) | 24.15/3.68 (3.68) 33.20/2.70 (2.70) 35.70/2.51 (2.52) 40.90/2.21 (2.21) 49.50/1.84 (1.84) | 34.95/2.57 (2.52) 63.20/1.47 (1.49) | 33.00/2.71 (2.70) 35.60/2.52 (5.52) 53.95/1.70 (1.69) 62.50/1.49 (1.49) | 33-0664 |

TABLE 5-continued

Nanocrystals in Ceramics 125–133 Identified by XRD analysis

| no. | crystal | 125[b] | 126[b] | 127[a] | 128[b] | 129[b] | 130[a] | 131[c] | 132[c] | 133[c] | ICDD file |
|---|---|---|---|---|---|---|---|---|---|---|---|
|  |  | 74.30/1.28 (1.26) |  |  | 57.60/1.60 (1.60) 62.40/1.49 (1.49) 64.00/1.45 (1.45) |  |  | 54.25/1.69 (1.69) 62.60/1.48 (1.49) 64.05/1.45 (1.45) 72.05/1.31 (1.31) 75.50/1.26 (1.26) |  |  |  |
| 2 | $\gamma$-$Fe_2O_3$ | 63.85/1.46 (1.45) |  | 14.15/6.25 (6.25) |  | 14.05/6.30 (6.25) | 14.50/6.10 (6.25) | 49.50/1.84 (1.85) | 14.30/6.20 (6.25) | 14.50/6.10 (6.25) | 02-0127 |
|  | $H_2O$ | 64.85/1.44 (1.43) |  |  | 49.40/1.84 (1.85) 54.10/1.69 (1.69) 62.40/1.49 (1.49) |  |  | 64.05/1.45 (1.45) 73.50/1.26 (1.26) | 63.20/1.47 (1.45) | 53.95/1.70 (1.69) |  |
| 3 | $\gamma$-$Fe_2O_3$ | 35.65/2.52 (2.51) | 35.65/2.52 (2.51) | 35.60/2.52 (2.52) | 35.60/2.52 (2.52) |  | 35.55/2.52 (2.52) | 35.70/2.51 (2.52) | 63.20/1.47 (1.47) | 35.60/2.52 (5.52) | 25-1402 |
|  |  |  |  | 57.50/1.60 (1.60) | 54.10/1.69 (1.70) 57.60/1.60 (1.60) |  | 40.65/2.22 (2.23) 57.50/1.60 (1.60) | 54.25/1.69 (1.70) 72.05/1.31 (1.32) 75.50/1.26 (1.26) |  | 53.95/1.70 (1.70) |  |
| 4 | $Fe_2O_4$ | 35.65/2.52 (2.53) |  | 35.60/2.52 (2.53) | 35.60/2.52 (2.53) | 35.48/2.53 (2.53) | 35.55/2.52 (2.53) | 35.70/2.51 (2.53) 62.60/1.48 (1.49) 75.50/1.26 (1.27) | 34.95/2.57 (2.53) | 35.60/2.52 (5.53) 53.95/1.70 (1.71) 62.50/1.49 (1.49) | 75-1372 |
| 5 | $Fe_2Si$ |  | 44.55/2.03 (2.00) |  |  | 45.40/2.00 (2.00) 66.35/1.41 (1.41) 84.15/1.15 (1.15) |  |  |  |  | 45-1207 |
| 6 | Fe |  | 43.65/2.07 (2.08) |  |  |  |  |  |  |  | 31-0619 |
| 7 | $SiO_2$ |  | 28.45/3.13 (3.11)[d] |  |  | 30.40/2.94 (2.94)[d] |  |  |  |  | d,e |
| 8 | SiC | 35.65/2.52 (2.51)[f] | 35.65/2.52 (2.51)[f] 59.85/1.54 (1.54)[f] | 35.60/2.52 (2.51)[f] | 35.60/2.52 (2.51)[f] | 35.48/2.53 (2.51) 38.05/2.36 (2.37) 59.95/1.54 (1.55)[g] | 35.55/2.52 (2.51)[f] | 35.70/2.51 (2.51)[f] |  | 35.60/2.52 (5.51)[f] | f,g |
| 9 | C |  | 26.90/3.31 (3.35)[g] |  |  | 26.50/3.36 (3.35)[h] |  |  |  |  | h |

[a]The values given in the parentheses are taken from the powder diffraction files of the database of the International Center for Diffraction Data (ECDD). [b]Ceramics prepared from poly[1,1'-ferrucenylene(methyl)silyne] (117). [c]Ceramics prepared from poly[1,1'-ferrocenylene (vinyl)silyne](122). [d]Coesite: ICDD data file 72-1601: [e]Stishovite: ICDD data file 72-2310. [f]Carborundum: ICDD data file 73-1708. [g]ICDD data file 75-1541. hGraphite: ICDD data file 75-2078.

The ceramics 125, 127, 128 from poly[1.1'-ferrocenyl (methyl)silyne ] (117) and 130–133 from poly[1,1'-ferrocenyl(vinyl)silyne] (117) contain the elemental Fe in a mixture forms of mainly $\alpha$-$Fe_2O_3$ with less amounts of $\gamma$-$Fe_2O_3H_2O$, $\gamma$-$Fe_2O_3$, and Fe also revealed from XPS study. There was only small amount of $Fe_3O_4$ crystal evidenced in XRD, suggesting most of $Fe_3O_4$ is in amorphous state. A little of SiC was also detected from these ceramics at 35.65° (2.52 Å), correlating well to the Si 2p photoelectron spectra of these ceramics, as a tiny shoulder at 101.5 eV binding energy (SiC) hints the trace amount of SiC existed in the ceramics. No XRD diffraction patterns of $SiO_2$ were found, indicating the $SiO_2$ is in irregular amorphous state.

Example 23

All the ceramic products 125–133 can be readily attracted to a bar magnet at room temperature; that is, they are readily magnetizable. The SQUID technique was therefore used to investigate their magnetization behaviours in magnetic fields. Results are summarized in Table 6 and the representative curves of magnetization versus applied magnetic field at 5 and 300K of ceramics 126 and 129 are displayed in FIG. 4.

As shown in the upper panel of FIG. 4, at 300K, 126 is magnetized even when a weak magnetic field is applied. Its magnetization increases with an increase in the strength of the applied field and becomes saturated at ~16 emu/g when the external field reaches ~2 kOe. Its $M_s$ increases to ~21 emu/g when the temperature is decreased to 5K. The $M_s$ for 129 at this temperature is however, ~51 emu/g, which is ~2.5-fold higher than that for 126. The XPS and XRD analyses (see Examples 21 and 22) have revealed that $Fe_3Si$ is the major component of the nanocrystals in 129, while in 126, the nanocrystals are mainly $\alpha$-$Fe_2O_3$, with $\gamma$-$Fe_2O_3$, Fe and $Fe_3Si$ existing in relatively small quantities. $Fe_3Si$, $\gamma$-$Fe_2O_3$, and Fe are the best-known magnetic materials but $\alpha$-$Fe_2O_3$, is only weakly magnetic. 129 thus should show higher magnetizability than 126. The SQUID measurements prove that this is indeed the case, reinforcing the composition analyses of the ceramics by the XPS, EDX, and XRI) techniques. All the other ceramics, i.e. 125, 127, 128, 130–133, give relatively lower saturation magnetization values ($M_s$=5–15 emu/g), which is reasonably expected from their compositions. As it was revealed from XPS and XRD studies that the major components of Fe complexes in these ceramics are $\alpha$-$Fe_2O_3$ and $Fe_3O_4$, mixed with lesser amounts of $\gamma$-$Fe_2O_3H_2O$, $\gamma$-$Fe_2O_3$, Fe and SiC, this causes these ceramics to be weaker magnetic materials.

TABLE 6

Magnetization Behaviour of Ceramics 126–133

| | | 5 K | | | 300 K | | |
|---|---|---|---|---|---|---|---|
| No. | Ceramics | $M_s^a$ (emu/g) | $M_r^b$ (emu/g) | $H_c^c$ (Oe) | $M_s^a$ (emu/g) | $M_r^b$ (emu/g) | $H_c^c$ (Oe) |
| 1 | 125 | 8.9 | 3.4 | 606 | 7.3 | 0.9 | 190 |
| 2 | 126 | 21.3 | 6.4 | 180 | 15.9 | 2.6 | 65 |
| 3 | 127 | 7.3 | 1.6 | 427 | 5.0 | 0.3 | 50 |
| 4 | 128 | 7.0 | 2.1 | 563 | 5.1 | 0.4 | 124 |
| 5 | 129 | 51.3 | ~0 | ~0 | 48.6 | ~0 | ~0 |
| 6 | 130 | 13.0 | 3.1 | 536 | 9.6 | ~0 | ~0 |
| 7 | 131 | 14.8 | 5.1 | 595 | 12.1 | 1.3 | 112 |
| 8 | 132 | 13.1 | 2.6 | 596 | 9.7 | ~0 | ~0 |
| 9 | 133 | 13.2 | 4.6 | 672 | 10.8 | 2.0 | 268 |

$M_s^a$:saturation magnetization measured under an external field of 20 kOe. $M_r^b$:magnetic remanence at zero external field. $H_c^c$: coercivity at zero magnetization When the portion of the magnetization plots in the low field region is enlarged, the hysteresis loops of 126 become clearly visible. Its $M_r$ and $H_c$ values at 300 K are, however, very low, being only 2.6 emu/g and 65 Oe, respectively. When the temperature is decreased to 5 K, the $M_r$ and $H_c$ values increase to 6.4 emu/g and 180 Oe, respectively. The remanence and coercivity of 126 are possibly due to the contribution from its $\gamma$-$Fe_2O_3$ component. Typical $H_c$ values for bulk $\gamma$-$Fe_2O_3$ maghemite are 250–400 Oe. The $H_c$ values for 126 are much lower (65–180 Oe), possibly due to the imperfect structure, the surface effect, and/or the small amount of the $\gamma$-$Fe_2O_3$ nanocrystals in the ceramic product. The other ceramics, i.e. 127, 128, 130–133, give wide ranges of $M_r$ (0 to 5 emu/g) and $H_c$ (0 to 600 Oe) (Table 6). This might come from the very diversified crystal patterns in these ceramics and their low magnetic compositions.

Interestingly, however, even at the high magnification, 129 does not seem to exhibit any hysteresis loops and its magnetization curves nearly cross the zero point (i.e. $M_r$~0, $H_c$~0), when the magnetization experiments are carried out at both 300 and 5 K. Silicon steel (Si—Fe) is widely used in electromagnetic systems because of its extremely low magnetic hysteresis loss. The near-zero $M_r$ and $H_c$ values of 129 are easy to understand because $Fe_3Si$ is the major component of the nanocrystals in the ceramic product. Thus 129 is an excellent soft ferromagnetic material with a high magnetic susceptibility and low hysteresis loss.

The foregoing is offered primarily for the purposes of illustration. It will be readily apparent to those skilled in the art that numerous variations, modifications and substitutions may be made in the materials, procedural steps and conditions described herein without departing from the spirit and scope of the invention.

What is claimed is:

1. A process for the preparation of a hyperbranched organometallic polymer which comprises reacting dilithioferrocene or a complex thereof with a compound of the general formula $RSiX_3$ in which R represents a hydrogen atom or an optionally substituted alkyl, alkenyl or aromatic group and each X independently represents a halogen atom, optionally in the presence of an anionic initiator.

2. A process according to claim 1 in which a complex of dilithioferrocene with tetramethylethylene diamine (TMEDA) is used.

3. A process according to claim 2 in which the complex of dilithioferrocene with TMEDA is prepared by reacting ferrocene with TMEDA in the presence of a solvent and a lithiating agent.

4. A one-pot process for the preparation of a hyperbranched organometallic polymer which comprises reacting ferrocene with TMEDA in the presence of a solvent and a lithiating agent, optionally adding an anionic initiator, and reacting the resultant mixture with a compound of the general formula $RSiX_3$ in which R represents a hydrogen atom or an optionally substituted alkyl, alkenyl or aromatic group and each X independently represents a halogen atom.

5. A process according to claim 1 in which the anionic initiator, if present, is n-butyl lithium.

6. A process according to claim 1 in which the anionic initiator, if present, is added to the reaction mixture under an inert atmosphere.

7. A process according to claim 1 in which R represents an optionally substituted $C_{1-24}$ alkyl or $C_{2-12}$ alkenyl group.

8. A process according to claim 7 in which R represents a methyl, n-octyl, n-dodecyl, n-hexadecyl, n-octadecyl or ethenyl (vinyl) group.

9. A process according to claim 1 in which X represents a chlorine atom.

10. A hyperbranched organometallic polymer produced by a process according to claim 1.

11. A hyperbranched organometallic polymer selected from the group consisting of poly [1,1'-ferrocenylenesilynes], poly [1,1'-ferrocenylene-(alkyl) silynes], poly [1,1'-ferrocenylene(alkenyl)silynes] and poly [1,1'-ferrocenylene(aromatic)silynes].

12. A hyperbranched organometallic polymer according to claim 11 of the general formula

 (I)

in which Fc represents a 1,1'-ferrocenylene group, R represents a hydrogen atom or an optionally substituted alkyl, alkenyl or aromatic group and n represents an integer greater than 1.

13. A polymer according to claim 12 which contains at least one moiety of the general formula

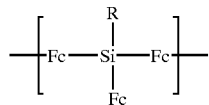

in which Fc and R are as defined in claim 12.

14. A polymer according to claim 12 which has a structure of the general formula

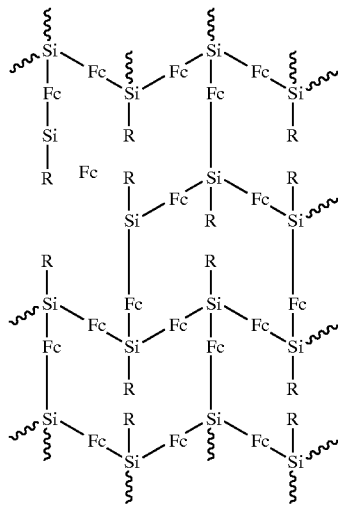

in which Fc and R are as defined in claim 12.

15. A polymer according to claim 14 in which R represents a methyl or ethenyl (vinyl) group.

16. A polymer according to claim 12 which has a structure of the general formula

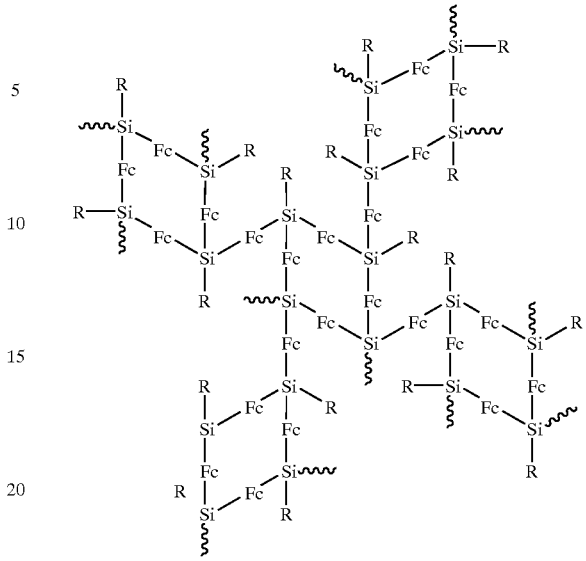

in which Fc and R are as defined in claim 12.

17. A polymer according to claim 16 in which R represents an n-octyl, n-dodecyl, n-hexadecyl or n-octadecyl group.

18. A process for the preparation of a ceramic material which comprises pyrolysing a hyperbranched organometallic polymer as defined in claim 11 under an inert gas atmosphere.

19. A process according to claim 18 in which the inert gas is nitrogen or argon.

20. A process according to claim 18 in which the pyrolysis is carried out at a temperature in the range from about 700° C. to about 1200° C.

21. A ceramic material produced by a process according to claim 18.

22. A ceramic material containing iron, silicon and carbon which comprises a three-dimensional mesoporous network of nanoclusters.

23. A ceramic material according to claim 22 which also contains oxygen.

* * * * *